US008199966B2

(12) United States Patent
Guven et al.

(10) Patent No.: US 8,199,966 B2
(45) Date of Patent: Jun. 12, 2012

(54) SYSTEM AND METHOD FOR PROVIDING CONTEMPORANEOUS PRODUCT INFORMATION WITH ANIMATED VIRTUAL REPRESENTATIONS

(75) Inventors: Sinem Guven, New York, NY (US); Myron Flickner, San Jose, CA (US); Gopal Sarma Pingali, Mohegan Lake, NY (US); Mark Edward Podlaseck, Kent, CT (US); Robyn Ruth Schwartz, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 1026 days.

(21) Appl. No.: 12/120,381

(22) Filed: May 14, 2008

(65) Prior Publication Data

US 2009/0285483 A1  Nov. 19, 2009

(51) Int. Cl.
*G06K 9/00* (2006.01)
(52) U.S. Cl. .................. 382/100; 345/473; 705/27.2
(58) Field of Classification Search ............ 705/26.1, 705/27.2, 27.1; 345/473
See application file for complete search history.

(56) References Cited

U.S. PATENT DOCUMENTS

| | | | | |
|---|---|---|---|---|
| 5,566,291 A * | 10/1996 | Boulton et al. | ............... | 715/709 |
| 5,884,029 A * | 3/1999 | Brush et al. | ................... | 709/202 |
| 6,993,573 B2 * | 1/2006 | Hunter | ........................... | 709/218 |
| 7,209,895 B2 * | 4/2007 | Kundtz et al. | ................ | 705/14.4 |
| 7,387,250 B2 * | 6/2008 | Muni | ....................... | 235/462.01 |
| 7,472,081 B1 * | 12/2008 | Cason | ........................ | 705/26.8 |
| 7,599,855 B2 * | 10/2009 | Sussman | ...................... | 705/26.8 |
| 7,729,946 B2 * | 6/2010 | Chu | ........................... | 705/26.61 |
| 7,856,343 B2 * | 12/2010 | Jo et al. | ............................ | 703/1 |
| 7,908,175 B2 * | 3/2011 | Chang et al. | ................ | 705/26.8 |
| 8,103,959 B2 * | 1/2012 | Cannon et al. | ................ | 715/753 |
| 2006/0036502 A1 * | 2/2006 | Farrell | ............. | 705/23 |
| 2006/0258397 A1 * | 11/2006 | Kaplan et al. | ............. | 455/556.1 |
| 2007/0138270 A1 * | 6/2007 | Reblin | .......................... | 235/383 |
| 2007/0143128 A1 * | 6/2007 | Tokarev et al. | ..................... | 705/1 |
| 2008/0215975 A1 * | 9/2008 | Harrison et al. | ............. | 715/706 |
| 2008/0228580 A1 * | 9/2008 | Korman et al. | ................. | 705/14 |

OTHER PUBLICATIONS

Zhu et al., "Design of the PromoPad: an Automated Augmented Reality Shopping Assistant," 12th Americas Conference on Information Systems, Aug. 4-6, 2006, pp. 1-16.*
Zhu et al., "Personalized In-store E-Commerce with the PromoPad: an Augmented Reality Shopping Assistant," Michigan State University, 2004, pp. 1-19.*

* cited by examiner

*Primary Examiner* — John Strege
*Assistant Examiner* — Shefali Goradia
(74) *Attorney, Agent, or Firm* — Tutunjian & Bitetto, P.C.; Louis J. Percello, Esq.

(57) ABSTRACT

A system and method for providing contemporaneous product information with animated virtual representations includes identifying a product by detecting a marker with a user device. Based upon the product, an animated virtual representation is generated in a display of the user device. Information about the product is conveyed to the user by virtual interaction with the animated virtual representation.

25 Claims, 5 Drawing Sheets

SYSTEM AND METHOD FOR PROVIDING CONTEMPORANEOUS PRODUCT INFORMATION WITH ANIMATED VIRTUAL REPRESENTATIONS

RELATED APPLICATION INFORMATION

This application is related to commonly assigned U.S. patent application Ser. No. 12/120,398, entitled "SYSTEM AND METHOD FOR PROVIDING CONTEMPORANEOUS PRODUCT INFORMATION AND SALES SUPPORT FOR RETAIL CUSTOMERS" filed currently herewith, and incorporated herein by reference in its entirety.

BACKGROUND

1. Technical Field

The present invention relates to product information and more particularly to systems and methods which address the problem of obtaining advice, support and information about a product in a retail store during shopping as well as over the life of the product after the product is purchased.

2. Description of the Related Art

In a retail store environment, there are several challenges faced by shoppers and retailers. Shoppers often find it difficult to get the information they need about a product in the store. Customers today expect access to peer reviews and social content around products, as well as recommendations, and retailer and supplier-generated content. This may include information about how popular the product is, how other consumers are rating/reviewing the product, how experts have reviewed the product, how accurate information on features, functions, accessories, related products, etc. Retailers are often challenged in providing this information to customers.

In-store support personnel (salespeople, advisors, etc.) are expensive and retailers are increasingly unable to provide sufficient personal support to shoppers. Retail suffers generally 100% labor turnover and so continually educating resources on fast changing product lines is expensive and difficult. This coupled with cost cutting measures in training programs—have left store associates less knowledgeable than peer networks in the mind of the customer. Informational product displays are a lower-cost alternative; however, paper displays are limited by the effort needed to keep them up-to-date, their relatively low information value, and, from a merchandising perspective, the fact that they are usually unattractive.

Interactive electronic displays are also being used, but are available only in particular areas of the store due to space constraints. The shopper is not able to get the information they need at the desired moment at any and every product in the store.

Reviews and ratings of products are available on the World Wide Web today, but this information is not readily accessible by the shoppers in retail stores. People may look to cell phones to make calls to other people to obtain information about a product, e.g., from web reviews, etc. Others access some of this information from their web-enabled hand-held devices. However, there are several drawbacks here. The shopper may find useful reviews on a competitor's site, which is potentially disastrous for the current purchase or future ones. Also, the product under consideration in the store may not be available online, or may be hard to find online. Moreover, web searching and browsing for additional information occurs through interfaces which are not necessarily under the store's control, and are disruptive to a well-designed and consistently-branded shopping experience.

Shoppers are not able to provide their own ratings and reviews on products during the course of their in-store shopping experience. It is extremely expensive for brick-and-mortar retailers to generate an amount of interest and traffic data at a product level that online retailers collect for free.

Customers want personalized in-store experiences that are about them and about the products that they are interested in. Also, customers do not just buy products based on product attributes, but are more and more focused on the lifestyle qualities of products that they purchase or intend to purchase. They want to understand how a product fits into their life. This requires very personalized, contextual selling capabilities.

Retailers are looking to better attract shoppers to their store with a more compelling experience. They are challenged with providing the shoppers the information and advice they need in the store in a manner that is both effective and entertaining.

Over the life of a product, there are several challenges faced by consumers and retailers/manufacturers of a product. Some of the challenges include the following. Consumers need information about a product after it has been purchased, e.g., the latest updates on the product, warranty information, technical support, accessories and upgrades, replacement alternatives, feedback from others about the product and related products, product recall information, how popular the product is, how others are rating this product, more information on features and functions, and finally what to do when it is time to replace the product. Today, they have to call product support numbers (finding the right number to call is itself a challenge) and often wait for many minutes or hours to get a customer service representative who may or may not provide the right information. Consumers are also searching for information on the web such as reviews and answers from other people, but this information is often divorced from the information provided by the retailer/manufacturer, and the burden is on the consumer to find and correlate these various sources of information.

On the other hand, retailers/manufacturers are trying to engage consumers of their products with a variety of additional information such as warranties, upgrades, accessories, related products, etc. The retailers/manufacturers are trying to convey this information to the consumer via pamphlets sent over mail, by sending email messages, making phone calls, etc. However, these are often considered "spam" by consumers and are discarded most of the time while typically not being available to them when they really need them.

Consumers are also not empowered to provide their ratings, feedback, and issues about a product from the product itself. Thus, retailers/manufacturers are getting a limited number of reviews, ratings and issues regarding their products over the life of the products.

SUMMARY

A way for shoppers to readily access the information and advice that they need on a product and consider relevant and contextual information to support buying decisions, right at the product, in a manner that is consistent with their in-store shopping experience is provided. This serves as a much more effective and entertaining channel for retailers to inform and engage with their shoppers within store environments. A way for consumers to readily access the information and advice they need about a product, right at the product, whenever and wherever they need it over the life of the product is also provided. This also serves as a much more effective channel for retailers/manufacturers to inform and engage with the consumers of their products in the environments that the products and the consumers live in.

A system and method for providing contemporaneous product information with animated virtual representations includes identifying a product by detecting a marker with a user device. Based upon the product, an animated virtual representation is generated in a display of the user device. Information about the product is conveyed to the user by virtual interaction with the animated virtual representation.

A system and method for providing contemporaneous product information with animated virtual representations includes identifying a product by detecting a marker with a user device. Based upon the product, an avatar overlay, e.g., is generated in a display of the user device. Information about the product is conveyed to the user by virtual interaction with the avatar.

A system for providing contemporaneous product information with animated virtual representations includes a back-end configured to collect information about a product from a product information source in accordance with a user request. The back-end is configured to communicate with at least one user device such that upon identifying a product by detecting a marker with the user device, product information is retrieved from the product information source, and an animated virtual representation is composed for display on the user device to dynamically provide real-time information to the user device. A server is coupled to the back-end to provide the product information source. The server has a plurality of different information sources from which to collect information including avatar composition information and at least one of social data, support information and promotional information.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
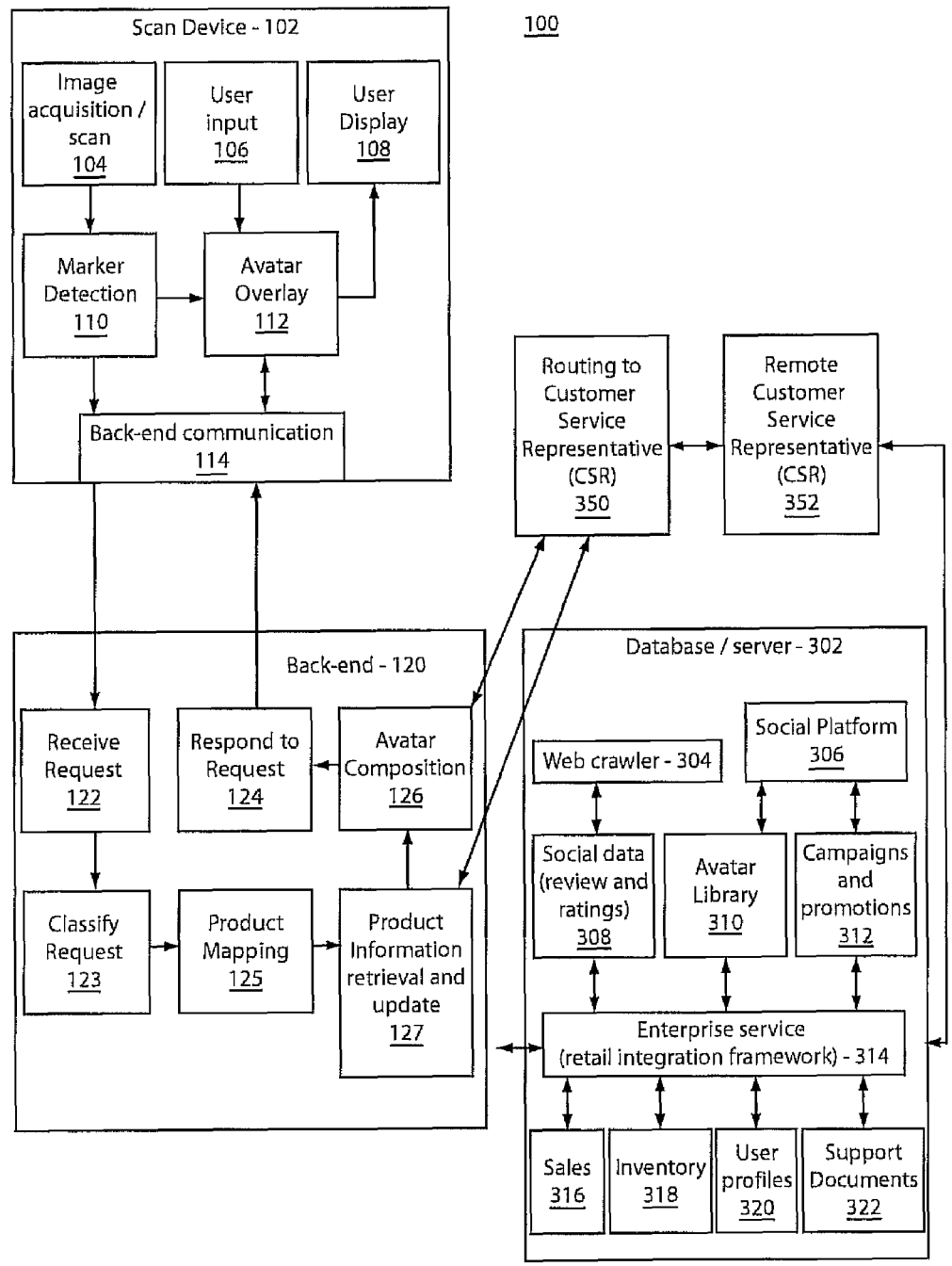
FIG. 1 is a block/flow diagram showing a system/method for providing contemporaneous product information with animated virtual representations in accordance with the present principles.

In accordance with the present principles, product information is provided to a consumer at the product at the location in a store which is both informative and entertaining. In addition, product information is provided to a consumer at the product over the product's lifetime. In one embodiment, retailers attach small unique markers to products such as a distinct pattern, a two-dimensional bar code, etc., which can be recognized through visual recognition software (or bar code reader) that takes an image of the product. When a shopper/consumer points a cell phone camera at this product/marker, information about the product such as product summary, support information, reviews, sales, recommendations generated by recommender systems, etc., are obtained dynamically from the retailers/manufacturers' back-end systems and/or the Internet. This information is conveyed to the shopper/consumer through an intuitive multimedia animated virtual representation that appears in the shopper/consumer's cell phone display, augmenting the live image of the product and communicating with the end user through different modalities such as gestures and speech.

For example, a virtual representation may be one or more animated graphical avatars, which appear to reside on the physical product and talk to the shopper, providing a summary of the product, latest reviews, etc. The avatars can deliver preexisting information, such as reviews by previous buyers, or converse with the shopper in real-time via customer service representatives on the back-end. The shopper/consumer could also add their own ratings and reviews on a product at any time —thus making a store environment or their own home or office environment into a virtual multimedia web log (blog). This information flows back to the retailers/manufacturers and may be used as feedback for other shoppers/consumers, enabling new "in-situ" reviews and ratings of products. In one embodiment, the fact that a consumer is even requesting information about a product may be sent back to a server and recorded for statistics or to generate information (e.g. marketing information) for the retailer/manufacturer.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The viewing device may include a hardware device such as a cell phone, a personal digital assistant, a specially designed scanning device or other suitable device. The device may include an integrated circuit chip or chips, which include memory for storing and running software. The chip design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., Graphic Data System II (GDSII)) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can have a display, a keyboard or other input device, and a central processor.

Referring now to the drawings in which like numerals represent the same or similar elements and initially to FIG. 1, a system/method 100 for providing product information to a consumer at a location in a store or during the product's lifetime at any location is illustratively shown. The system/method 100 provides an interactive experience where product information is preferably provided in real-time and in an entertaining way. A scan device 102 includes a user's handheld device, such as a cell phone, personal digital assistant, customized device or any other suitable scan device with display or acoustic output capabilities. The scan device 102 may be provided to a user at the store and returned when the user has completed their shopping. The device may be connected to or be part of a shopping cart, among other things.

The scan device 102 includes an image acquisition module 104. This may include a camera, a bar code scanner or the like capable of reading identifying information about a product. In one scenario the product is on a shelf in a store, in another scenario, the product is in the user's home or other location when the product code or image is scanned. Once scanned the image is detected by a mark detection module 110. This module 110 uniquely identifies the product. This may be performed using a UPC code, bar code, RFID, image recognition or other technology. Once identified, an animated virtual representation, e.g., an avatar overlay is provided. In one embodiment, an avatar or a virtual character is generated for display on a user display 108. The avatar can perform many functions. The avatar may include a character associated with a retailer or manufacturer. The avatar may be selected by the user using a user input 106 or may be assigned based on the product or other criteria.

Information about the product, the avatar, the avatar's role and scripts are provided through communication with a backend. A back-end communication module 114 provides two-way communication with a retailer's back-end module 120. This communication is preferably wireless although wired communications may also be employed.

The user input 106 may also provide the user with a method for entering feedback, such as, user reviews on the product in the form of text, audio, video, etc. The very act of the user pointing the device 102 at a product also constitutes user input. User input 106 may include the time period of interaction of the user with a product and optionally the user identification (such as the cell phone number). Thus, user input 106 also enables the user to leave their "footprints" on a product and leave their opinions or messages at a product. These inputs provide valuable "virtual click" data and "blogs" situated in the real world. This converts a real environment such as a retail store into a social networking and blogging environment.

The back-end 120 includes a receive request module 122 that receives requests for product information or requests for user service or other user inputs such as phone number, virtual clicks, and reviews. Once received, the request is classified as to type. This may include in-store requests, at home (or other location requests), request for product information, request for reviews ad ratings, requests to update a product with new reviews, update a product with virtual clicks, provide or update a user profile, request to add a review or a message to a user's social network, etc. The classification of the request is based on the information stored (see e.g., the information types stored in database/server 302). The product is mapped to the appropriate information source (e.g., a database/server of a retail store or manufacturer) in block 125. Once the product is mapped to the information source, the product information is retrieved and/or product updates are determined in block 127. The product type and the source of information may be employed to compose the avatar used to deliver this information to the user in block 126. In block 124, the information is relayed to the scan device 102 through back-end communication 114 for display and interaction with the requesting user.

Blocks 126 and 127 may handle the request for product information by putting a user directly in contact with a customer service representative through block 350. Customer service representatives may be virtually generated in the form of an avatar (in block 126) or may be live representatives and provided from a remote customer service pool 352.

Product information and updates (block 127) receive information from a database/server 302 or other information source. An enterprise service (retail integration framework) 314 manages a plurality of information sources for a particular establishment or establishments. Information sources may include sales information 316 (e.g., 20% off or sales data for that product, e.g., sales have increased on this product by 50% over the last six months). Information sources may include inventory 318 (how many are in stock at which location, etc.). Information sources may include user profiles 320 for individual users (e.g., your family purchased $620 worth of merchandise in the last week, user favorites, e.g., favorite avatar, shopping data, etc.). Support documents 322 may be included to provide information about assembly, warranties, how to use, how to replace the batteries, how to purchase this item again, how to replace this item should it break during its lifetime, etc.

Information sources may further include social data 308. Social data 308 may include reviews from other users, product rating, recommendations from recommender systems and other information. This information may be stored in the database or searched from the web. For example, a web crawler 304 may search for product information in the form of user reviews and ratings and report back to a user pursuant to a user request. An avatar library 310 may include a plurality of avatars that may be selected for a user or by a user. The avatar library 310 may include scripts or other avatar content to be delivered to the user through the user display. This includes video clips, sound, images, text, data streams, and/or any other media.

Information sources may also include campaign and promotion information 312. This includes discounts, coupons, rebates, membership points, and/or any other promotional information. The avatar library 310 and the campaign and promotions 312 may gather information from a social platform 306 which monitors competitors or other external information sources for updates to avatars, warranty information, product recalls and any other dynamically changing information.

The operation of system 100 will now be explained using illustrative examples. 1) A consumer points his phone at a given/selected product in a store (as indicated by in-store signage) and could receive additional information about that product via their mobile device. The cell phone (102) would become a lens through which a shopper views the product. The data being retrieved would be customer submitted reviews (308) on that given product. A consumer would also be able to use their phone to leave reviews or ratings on any product or department in the store or simply indicate "I was here" through user input 106. As a result, consumers could point phones to different areas of a store and view at a glance (through auras overlaid on products for example) which are the hot products in the store receiving most reviews, which products have been seen/commented on by their friends, etc. The users could then drill down to read specific reviews or ratings on a product, view related products, etc. This could leverage social networking technology in the store while making the in-store experience more collaborative and fun. The whole store would become a virtual multimedia blog that would be accessible via Augmented Reality. In one embodiment, Lotus™ tools could be leveraged for collaboration— and Retail Integration Framework for information on the in-store inventory (price, promotion, location, availability, etc).

2) Every/any product in a retail store could have a visual marker associated with it such as a two-dimensional barcode. When a shopper points their cell phone camera at such a marker, it would trigger the appearance of an avatar that would appear to reside on or near the marker/product and communicate with the shopper with speech, gestures, expressions, and/or text. The avatar could be a virtual advisor giving the shopper a summary of the product (its reviews on the web, its sales, related products, what else people bought when they bought this product etc.). The avatar could indicate how "hot" the product is in terms of number of reviews, extent of sales, etc., via a wide spectrum of cues: its activity, props, clothing, speech patterns, etc.

The form of this advisor avatar and the messages delivered by the avatar could also be personalized to the shopper, based on their cell phone number and user profile 320. There could also be multiple avatars associated with a product—for example, each review on the web could be associated with a different avatar. In this case, the avatar could even be chosen or provided by the person doing the review on the web.

In addition, a remote advisor/salesperson/support person 352 could provide the shopper live help through an avatar. In this scenario, the use of the marker on the product and its associated avatar can extend well beyond the retail environment to the entire lifecycle of the product. Even after buying the product, a user could point their cell phone camera at the marker at any time to get latest information on the product, such as answers to frequently asked questions, customer or technical support, available accessories and upgrades for the product, latest reviews etc. Once again, the avatar could be a virtual advisor providing the end user with this information.

If necessary, the communication could shift from a virtual advisor with "canned" answers to a live support person communicating with the end user through an avatar.

Figure 2C:
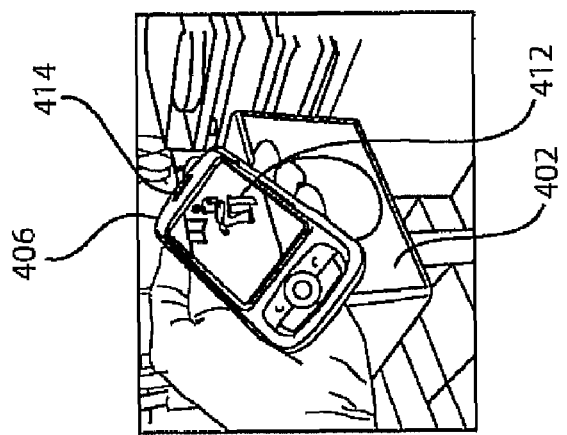
FIGS. 2A-2C illustratively show a product with a marker (FIG. 2A), a user device with an image of the marker (FIG. 2B), and the user device with an avatar generated (FIG. 2C) in accordance with one embodiment.
Figure 2B:
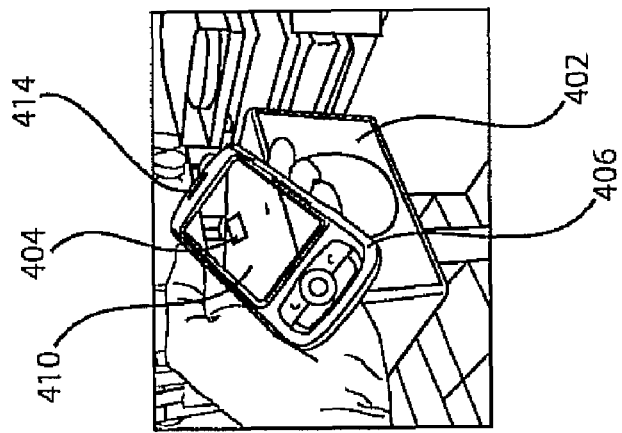
Figure 2A:
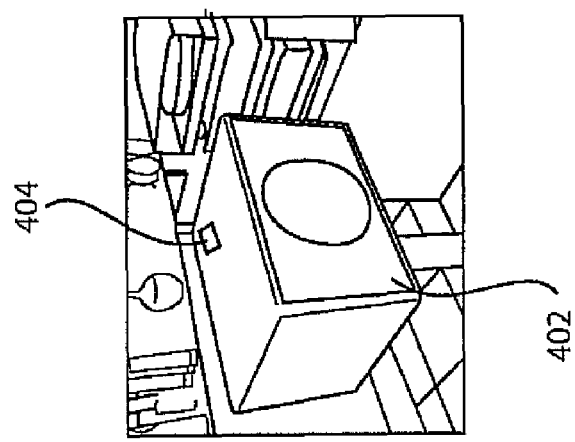
Figure 3:
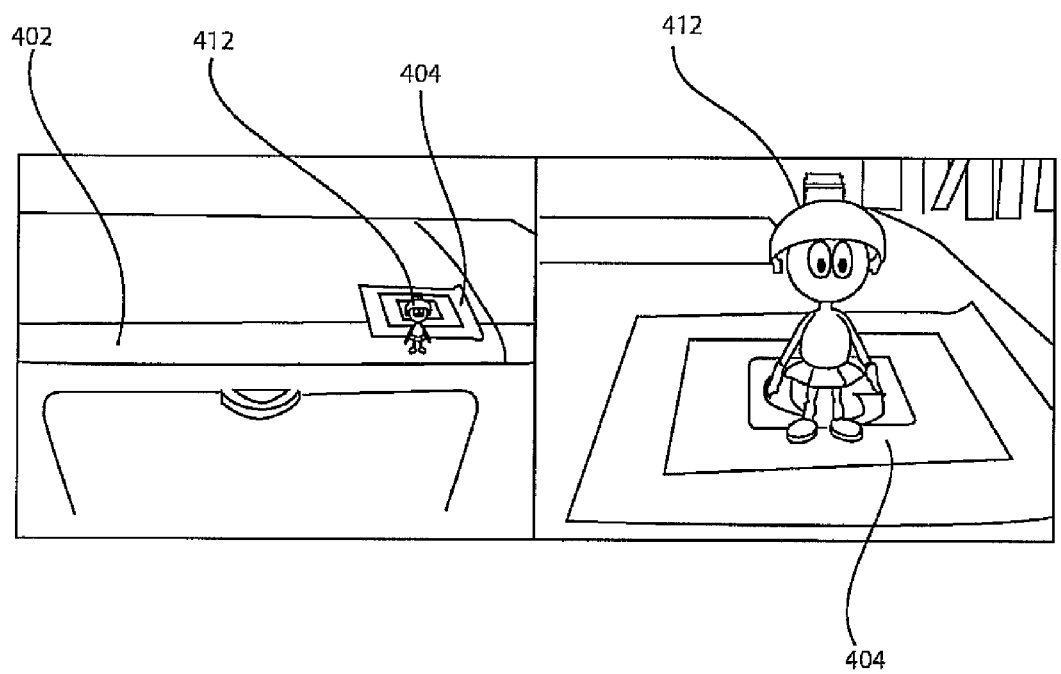
FIG. 3 is a close-up image showing an avatar near a marker on a product in accordance with the present principles.

Referring to FIGS. 2A-C and 3, FIG. 2A shows a product 402 with a marker 404. In FIG. 2B, a user device 406 with an image on a display 410 of the marker 404 is shown. The user device 406 with an avatar 412 generated is shown in FIG. 2C.

In an extension of the above scenarios, a cell phone or PDA 406 includes a marker detector (110 FIG. 1) such as a barcode scanner or camera that would trigger scan or image a mark 404 on a product 402, which would result in the appearance of an avatar 412. The avatar 412 appears on the product 402 (FIG. 3) in this instance and explains information about the product, its features, its capabilities etc., which can be scripted. This advantageously permits the avatar 412 to point out features of the product directly to the user and provides graphical, animated and entertaining explanations that the user may request. The avatar 412 may answer specific requests of the user or provide the opportunity to customize the experience using user input. The avatar 412 may work in conjunction with a menu-driven program to collect data, provide data and otherwise entertain the user using the display 410 and a speaker 414.

In one embodiment, a camera in the cell phone 406 could be pointed at the shopper/end user enabling the avatar 412 to communicate more naturally with the end user—for example by directing the gaze towards the end user, responding to what the end user is wearing, etc.

Figure 4:
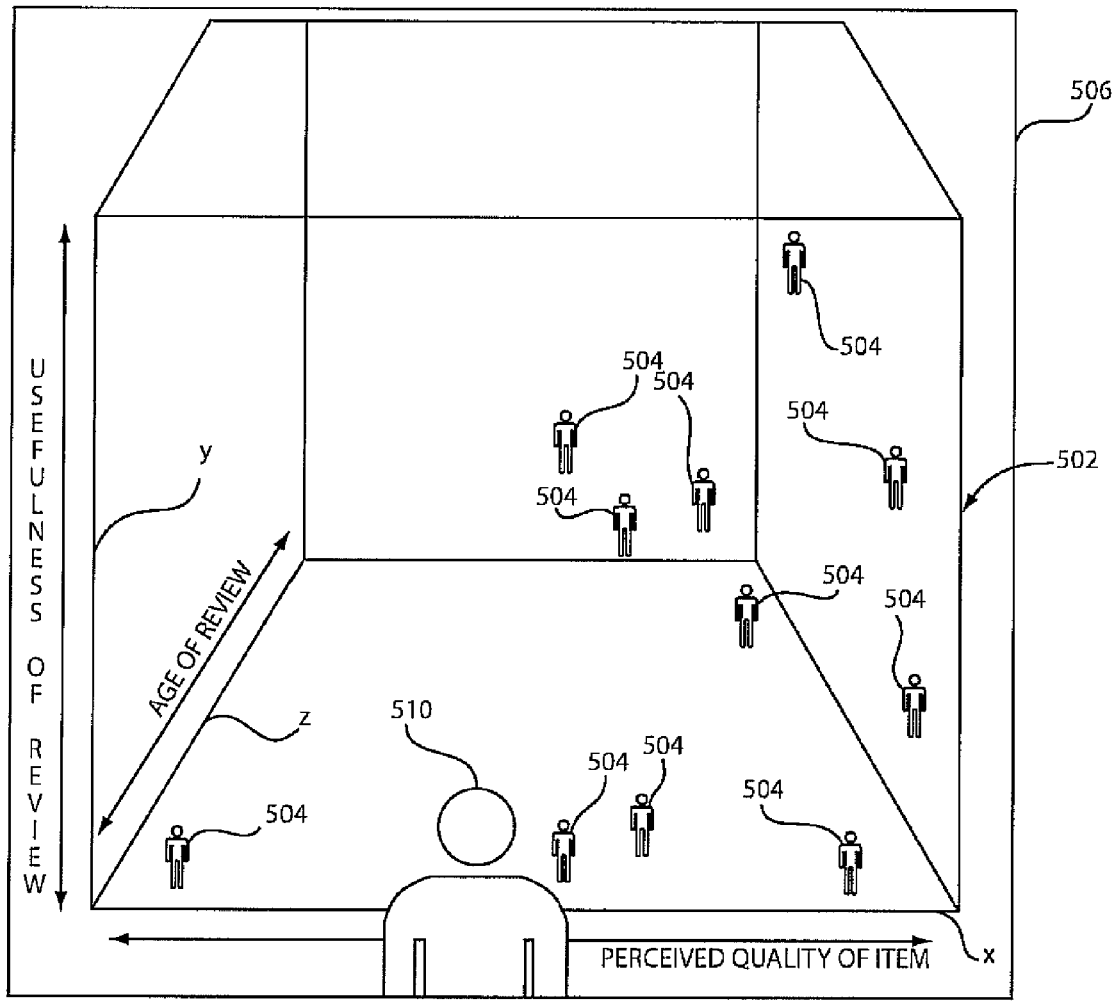
FIG. 4 is an illustrative representation of a display screen showing avatars of other users and a scatter-plot indicating review information in accordance with the present principles.

Referring to FIG. 4 with continued reference to FIG. 1, in one particularly useful aspect, a user or users may use the scan or user device 102 to interact with the back-end 102 to leave an interactive marker (e.g., an avatar, icon or other symbol) in a virtual space or page stored in a social data memory 308. In one embodiment, when the customer downloads and installs the application software onto their phone or scan device 102, the customers may be prompted to import an avatar or animated icon or image from another platform known to the application, to choose a new avatar from a list or create their own avatar.

When using the phone 102 to scan a product, a three dimensional visualization 502 of multiple avatars 504 is triggered by the application and appears on, in front of, or near the product, as depicted on a cell phone display 506. FIG. 4 depicts one illustrative instance of this in a retail environment with a three-dimensional scatter-plot of reviewers with x, y, and z axes respectfully represent; perceived quality of the product, usefulness of the review as rated by others, and the age of the review. Other features may be plotted as well. (Usefulness can also be personalized; by correlating the reviews/ratings/purchases of the current customer with those of the other reviewers, this dimension might be expressed as the similarity of the depicted reviewers to the customer in terms of "taste".)

While each avatar 504 may be inactive to display review data. The avatars 504 in the display screen 506 may be interactive as well. Clicking on or otherwise selecting the avatar 504 by user input 106 may render an individual review recorded by the person represented by that avatar. Further, a short video clip, music, sound, speech or other information may be rendered. This information is or was provided by the current or previous customers represented by the avatars 504.

An avatar 504 might be visually associated with several other products that he/she has felt strongly about hence providing additional context about the reviewer to the end-user. This information may be rendered on display 506 as well. In one embodiment, other users or shoppers who are currently looking at the item/product may also be depicted in the space as avatars 540 or be flashing or otherwise designated to indicate that these avatars represent people who are currently online. The paths of previous users through the visualization may be depicted, through slowly dissipating jet trails or simple color gradients. In this way, a record of what other products were browsed can be made available to the customer or to the retail store.

Browsers and reviewers that are in the user's social network are may be rendered as avatars with an indication of social proximity. Part of the user's avatar 510 may appear in the foreground of the display. To navigate, depending on the capabilities of the phone, the user can tilt the phone toward a region of interest, pan and zoom, or touch an avatar. This may be implemented using accelerometers, and other input devices. The display can lock the image of the item or product in the background as the user's avatar moves through the three-dimensional space to approach another avatar 504. In this position, the user can engage in a structured conversation with the avatar 504. If the person associated with the avatar 504 is online, the user can request a live conversation. If the person consents, the interaction shifts to a live conversation. Other interactions are also contemplated, such as text messaging, email, etc.

Figure 5:
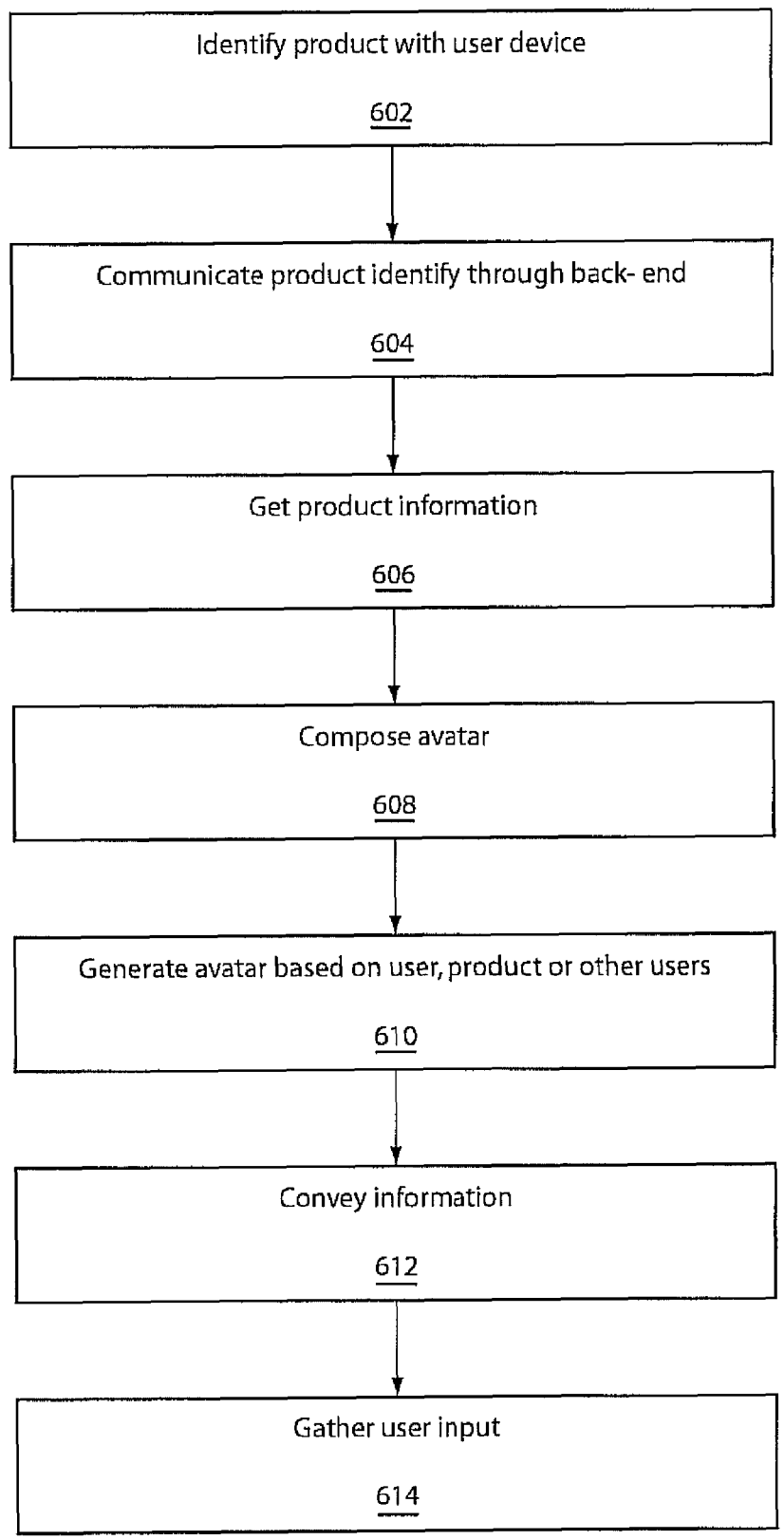
FIG. 5 is a block/flow diagram showing an illustrative method for conveying information to a user by virtual animations in real-time.

Referring to FIG. 5, a method for providing contemporaneous product information with animated virtual representations is illustratively shown in accordance with one embodiment. In block 602, a product is identified by detecting a marker with a user device. This may include acquiring an image with a camera of the user device and employing image recognition to identify the product, scanning a bar code with the user device, etc. In block 604, the marker information communicated to a back-end/server. This may include the use of the internet or local area network and the needed communications protocols.

In block 606, product information is collected through the back-end. In block 608, an avatar, animated virtual image or symbol is composed or determined based upon at least one of the product information and a user preference. A user may select a source of information that may determine which avatar is used. See block 610, for example. In block 610, an avatar overlay is generated in a display of the user device. This may include generating an avatar character associated with the product, designed by the user or provided using another customer's avatar made available by leaving a virtual symbol in a virtual product space, the virtual symbol having information associated therewith to be rendered by selection of the user. The virtual symbol or avatar of the other user may be stored and generated on the user's display to provide product reviews or critics. The virtual space may be rendered such that the placement of the virtual symbol in the virtual space indicates an opinion of a customer that left the symbol in the virtual space.

In block 612, information is conveyed about the product to the user by virtual interaction with the avatar. This information may include conveying information about at least one of promotions, sales, product reviews, product ratings, and inventory. The information may be provided after purchasing the product during the product's life cycle. In block 614 user input information is gathered related to the product.

Having described preferred embodiments of a system and method for providing contemporaneous product information with animated virtual representations (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for providing contemporaneous product information with animated virtual representations, comprising:
   identifying a product by detecting a marker with a user device;
   based upon the product, generating an animated virtual representation in a display of the user device; and
   conveying social data generated by other users about the product to the user by virtual interaction with the animated virtual representation.

2. The method as recited in claim 1, wherein identifying a product by detecting a marker with a user device includes acquiring an image with a camera of the user device and employing image recognition to identify the product.

3. The method as recited in claim 1, wherein identifying a product by detecting a marker with a user device includes scanning a bar code with the user device.

4. The method as recited in claim 1, wherein generating an animated virtual representation includes generating a user selected avatar character and generating an avatar character associated with the product.

5. The method as recited in claim 1, wherein conveying social data about the product to the user includes conveying information from other customers made available by leaving a virtual symbol in a virtual product space, the virtual symbol having information associated therewith to be rendered by selection of the user.

6. The method as recited in claim 5, wherein placement of the virtual symbol in the virtual space indicates an opinion of a customer that left the symbol in the virtual space.

7. The method as recited in claim 1, wherein conveying social data includes conveying information to a user in a retail store.

8. The method as recited in claim 1, wherein conveying social data includes conveying information about at least one of promotions, sales, product reviews, product ratings, and inventory.

9. The method as recited in claim 1, wherein conveying social data includes conveying information to a user after purchasing the product during the product's life cycle.

10. The method as recited in claim 9, wherein the social data includes at least one of warranty information, product recalls, support documents and maintenance information.

11. The method as recited in claim 1, further comprising gathering user input information related to the product.

12. A computer readable storage medium comprising a computer readable program for providing contemporaneous product information with animated virtual representations, wherein the computer readable program when executed on a computer causes the computer to:

identifying a product by detecting a marker with a user device;

based upon the product, generating an animated virtual representation in a display of the user device; and conveying social data generated by other users about the product to the user by virtual interaction with the animated virtual representation.

13. A method for providing contemporaneous product information with animated virtual representations, comprising:

identifying a product by detecting a marker with a user device;

communicating the marker information to a back-end;

collecting product information about the product at the back-end;

composing an avatar based upon at least one of the product information and a user preference;

generating an avatar overlay in a display of the user device; and conveying social data generated by other users about the product to the user by virtual interaction with the avatar.

14. The method as recited in claim 13, wherein identifying a product by detecting a marker with a user device includes one of acquiring an image with a camera of the user device and employing image recognition to identify the product; and scanning a bar code with the user device.

15. The method as recited in claim 13, wherein generating an avatar overlay includes generating an avatar character associated with the product.

16. The method as recited in claim 13, wherein generating an avatar overlay in a display of the user device includes generating the avatar overlay using another customer's avatar made available by leaving a virtual symbol in a virtual product space, the virtual symbol having information associated therewith to be rendered by selection of the user.

17. The method as recited in claim 13, wherein placement of the virtual symbol in the virtual space indicates an opinion of a customer that left the symbol in the virtual space.

18. The method as recited in claim 13, wherein conveying social data includes conveying information about at least one of promotions, sales, product reviews, product ratings, and inventory.

19. The method as recited in claim 13, wherein conveying social data includes conveying information to a user after purchasing the product during the product's life cycle.

20. The method as recited in claim 13, further comprising gathering user input information related to the product.

21. A computer readable storage medium comprising a computer readable program for providing contemporaneous product information with animated virtual representations, wherein the computer readable program when executed on a computer causes the computer in accordance with claim 13.

22. A system for providing contemporaneous product information with animated virtual representations, comprising:

a back-end configured to collect information about a product from a product information source in accordance with a user request, the back-end configured to communicate with at least one user device such that upon identifying a product by detecting a marker with the user device, product information is retrieved from the product information source, and an animated virtual representation is composed for display on the user device to dynamically provide real-time information to the user device; and a server coupled to the back-end to provide the product information source, the server having a plurality of different information sources from which to collect information including animated virtual representation composition information and social data generated by other users.

23. The system as recited in claim 22, wherein the at least one user device includes one of a cell phone, a personal digital assistant, and a specialized marker detection device.

24. The system as recited in claim 22, wherein the back-end gathers user input information related to the product which is employed as product feedback.

25. The system as recited in claim 22, wherein the product is identified in a retail store and the product information includes at least one of promotions, sales, product reviews, product ratings, and inventory.

\* \* \* \* \*